Oct. 3, 1967     H. SCHUUR ETAL     3,344,456
DUMP VEHICLE

Filed Oct. 24, 1965     3 Sheets-Sheet 2

INVENTORS
HEMMO SCHUUR
HAROLD GOETZINGER
BY
ATTORNEY

Oct. 3, 1967　　　H. SCHUUR ETAL　　　3,344,456

DUMP VEHICLE

Filed Oct. 24, 1965　　　3 Sheets-Sheet 3

INVENTORS
HEMMO SCHUUR
HAROLD GOETZINGER
BY
ATTORNEY

United States Patent Office 3,344,456
Patented Oct. 3, 1967

3,344,456
DUMP VEHICLE
Hemmo Schuur, Rte. 2, Box 95, and Harold Goetzinger, 127 Lawrence St., both of Mount Vernon, Wash. 98273
Filed Oct. 24, 1965, Ser. No. 504,487
7 Claims. (Cl. 15—93)

This invention relates relates to a dump vehicle and, more particularly, to a powered vehicle including a laterally moveable dumping receptacle for the collection and disposal of particulate or fluent material.

For the purposes of this disclosure, the invention will be described as applied to a poultry house cart and as used for the collection of poultry manure and its dumping at a point remote from where collected. It is current and common practice to provide extended rows or batteries of poultry cages, usually in two decks located one above the other. Such batteries extend throughout the length of a poultry house and normally are arranged in opposition to each other at the sides of a common alley or passage. Beneath the batteries of cages which are formed of one work material, are disposed inclined or horizontal dropping boards on which poultry manure is deposited. The apparatus described herein is particularly useful for the purpose of cleaning such dropping boards, for collecting and transporting the droppings away for ultimate disposal. It will, of course, be borne in mind that by describing this area of utility, it is not intended to limit the invention specifically thereto since it will be obvious that it will have utility in other environments.

A prime object of this invention is the provision of a simple, inexpensive and reliable self-powered apparatus to be driven along a relatively narrow and restricted passage for collecting material of a fluent nature disposed on shelves or decks at the sides of the path of travel to scrape or otherwise deflect such material therefrom into a receiving container or receptacle.

A more specific object of the invention is the provision of a novel and improved dump cart having a dumpable container mounted for lateral disposition to one side of the vehicle main axis so that it can be moved in and under a shelf or ledge from which it is to receive material dislodged in cleaning the same.

Still another object of the invention has been the provision of a vehicle frame to support and carry a laterally movable dumping receptacle or container in which the overall profile of the apparatus is kept low and compact, and due regard is given to the location to centers of force or centers of gravity so that even though the vehicle is carrying a relatively heavy load disposed considerably to one side of its fore and aft axis, the same has substantial stability against overturning.

The invention resides in certain constructions and combinations and arrangements of parts. Further objects and advantages will become apparent to those skilled in the art to which this invention relates from the following description of a preferred embodiment, described with reference to the accompanying drawings forming a part of this specification in which like reference to character designate corresponding parts, and in which.

Figure 1:
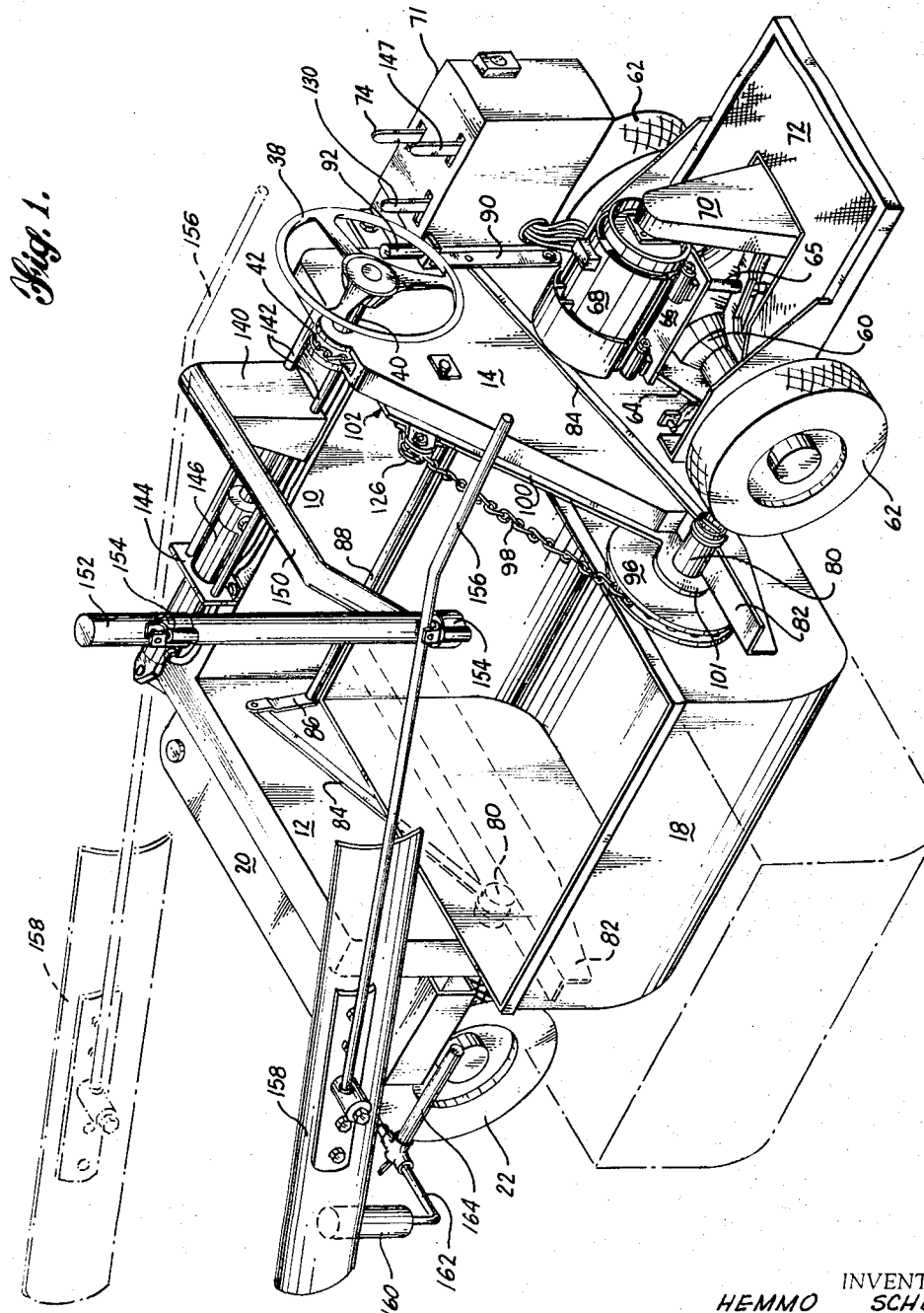
FIGURE 1 is a perspective view of apparatus embodying the present invention for collecting and dumping the fluid material.
Figure 2:
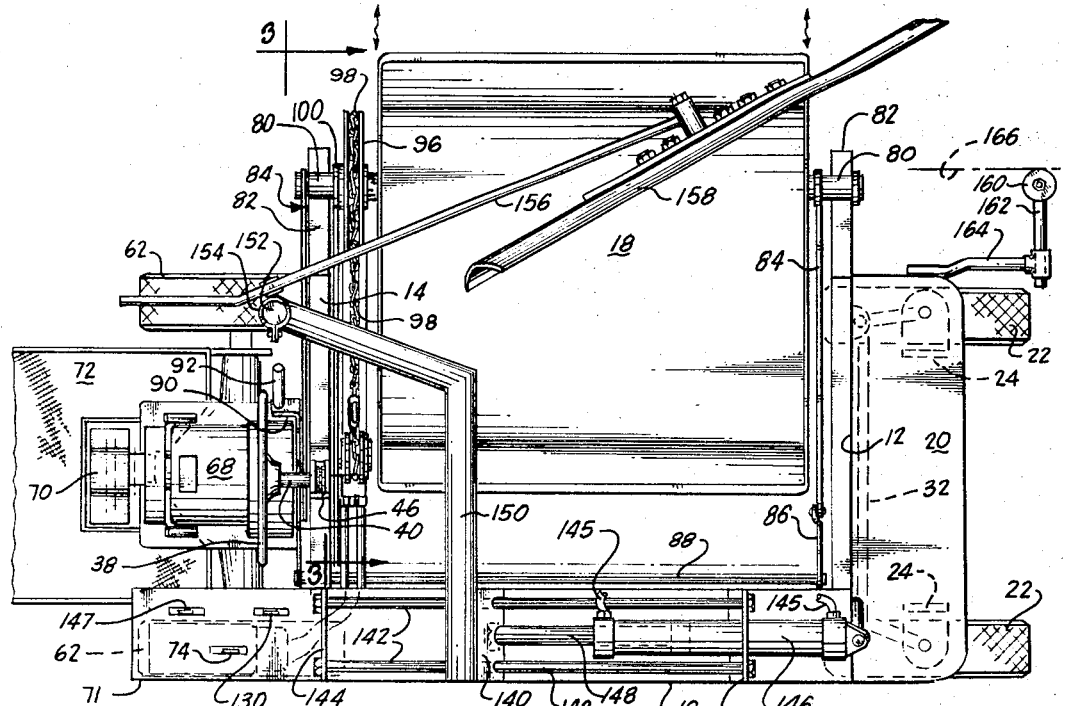
FIGURE 2 is a plan view of the apparatus shown in FIGURE 1.

Referring to FIGURE 1 and FIGURE 2 it will be seen that the cart has a generally U-shaped frame. A side wall 10 constitutes a longitudinal frame member. Laterally extending front wall 12 and laterally extending rear wall 14 are rigidly connected to the ends of said longitudinal frame member. Members 10, 12 and 14 define a well laterally open away from the inner side of member 10. The frame members or elements 10, 12, and 14 are fabricated from sheet metal by conventional welding techniques in hollow, box-line forms for lightness and strength and rigidity.

Figure 5:
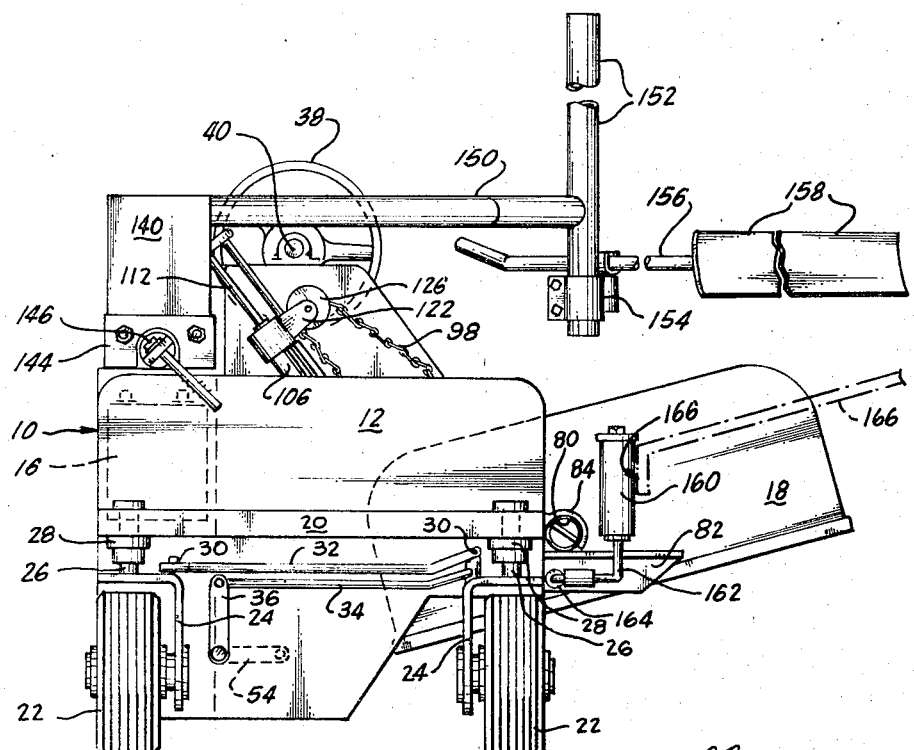
FIGURE 5 is a face view of the dump cart from the front.

In wall 10 of the frame, sufficient space is provided for receiving and carrying a source of power. In FIGURE 5 such is indicated as a storage battery 16, a number of which would be normally used where, as typically illustrated here, the drive means is electro-motive. It will be apparent, of course, that should the drive means be a gas or internal combustion engine, in frame wall 10 would be mounted a suitable receptacle for gasoline or other liquid fuel or suitable counter-balancing weighty means. The object of this arrangement is to load the right side of the frame, as viewed in FIGURE 1, whereby it and its contents will serve to counterbalance any overturning force that may be applied to the frame in the event that the container 18 is loaded and transversely extended as suggested by the dotted lines of FIGURE 1.

A forward extending ledge 20 is mounted on front wall 12 and front wheels 22—22 are caster-mounted thereunder by L-shaped fork-halves 24 having on their upper ends spindles 26 journalled in bearings 28. Between knuckle connections 30, one each on the fork halves 24, is a tie-rod 32 which insures that movement of one wheel 22, in a castering action results in like movement of the opposite wheel. A link 34 is pivotally connected at its ends between the upright arm 36 forming part of the steering mechanism and one of the fork-halves.

Figure 6:
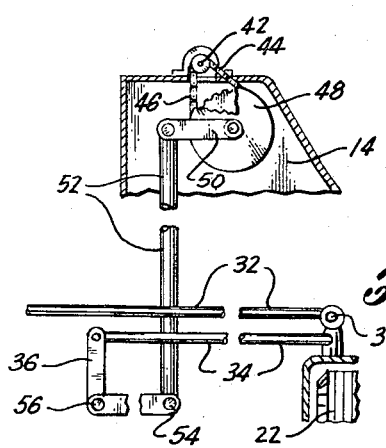
FIGURE 6 is a schematic view detailing the steering mechanism of the dump cart.

The steering mechanism, including steering wheel 38 by which steering shaft 40 is revolved, is located at the rear of the vehicle. Shaft 40 and sprocket 42 are thereby rotated. Shaft 40 is suitably journalled in the upper hollow rear wall or transverse frame member 14 as may best be seen in FIGURES 1 and 6. Chain 46 passes around the sprocket 44 and driven sprocket 48 to which is attached arm 50. Depending link 52 connects between arm 50 and arm 54 keyed to fore and aft shaft 56. The latter is suitably journalled in the lower portion of transverse frame members 12 and 14. On its front end shaft 56 is keyed or otherwise secured to arm 36. It will be seen that the arms 36 and 54 and shaft 56 constitute a bell crank mechanism whereby pushing and pulling force may be applied to the link 34 and thence to the half forks 24, to produce steering of the wheels 22 from a point at the rear of the vehicle.

At its rear, the cart has a differential housing 60 from which extend axle housings and axles on either side. The rear drive wheels 62—62 are secured to said axles. By means of supporting elements 64, 65, a shelf 66 is disposed above the transmission housing 60. Mounted thereon is a prime mover 68, in this instance, an electric motor. Motor 68 operates a drive sprocket (not shown) within housing 70 over which extends a drive chain to a driven sprocket that is connected to an input shaft of the transmission mechanism 60. A platform 72 for an operator is cantilevered from the rear transverse frame wall 14 at approximately the level of the axles of wheel 62. The operator somewhat straddles the drive means 68 and 70. Close at hand to the operator, within cabinet 72, are switch means controlled by switching levers 74 whereby the motor 68 may be energized to either drive forward or rearward or to be braked as required during operation.

The dump bucket or receptacle 18 is shown as generally rectangular in plan view and to substantially fill the well space, fore and aft and laterally defined by the frame walls 10, 12 and 14. At each end the bucket is provided with a trunnion 80. The trunnions 80 rest upon ledges 82, each carried on a transverse frame member of the vehicle frame as best shown in FIGURES 1 and 2. As the bucket 18 is moved outward or inward, the trunnions 80 slide on the upper surfaces of the arms 82.

Each of the trunnions is engaged by a push-pull link 84, the forward of such links (see FIGURE 1) on its inner end is connected to rock arm 86 on shaft 88. The inner end of the rear link 84 also seen in FIGURE 1, is connected to a manually operable lever arm 90 which, on its lower end, is securely attached to the rear end of shaft 88. By means of handle 92, arm 90 may be swung to the left or right to apply force directly to the link 84, and to apply force to the forward link 84 through the instrumentality of arm 86 and shaft 88 suitably journalled in the fore and aft transverse walls of the vehicle frame. When the operator desires to shift the bucket or container 18 from the inward or solid line position shown in FIGURE 1, to the dotted line position in the same figure, the arms 90 and 86 are caused to swing in a counterclockwise motion, applying an outward force on the trunnions 80. This causes them to slide outward on their supporting ledges 82. Clockwise motion of arm 90 will result in an opposite or inward movement of the receptacle 18.

Figure 3:
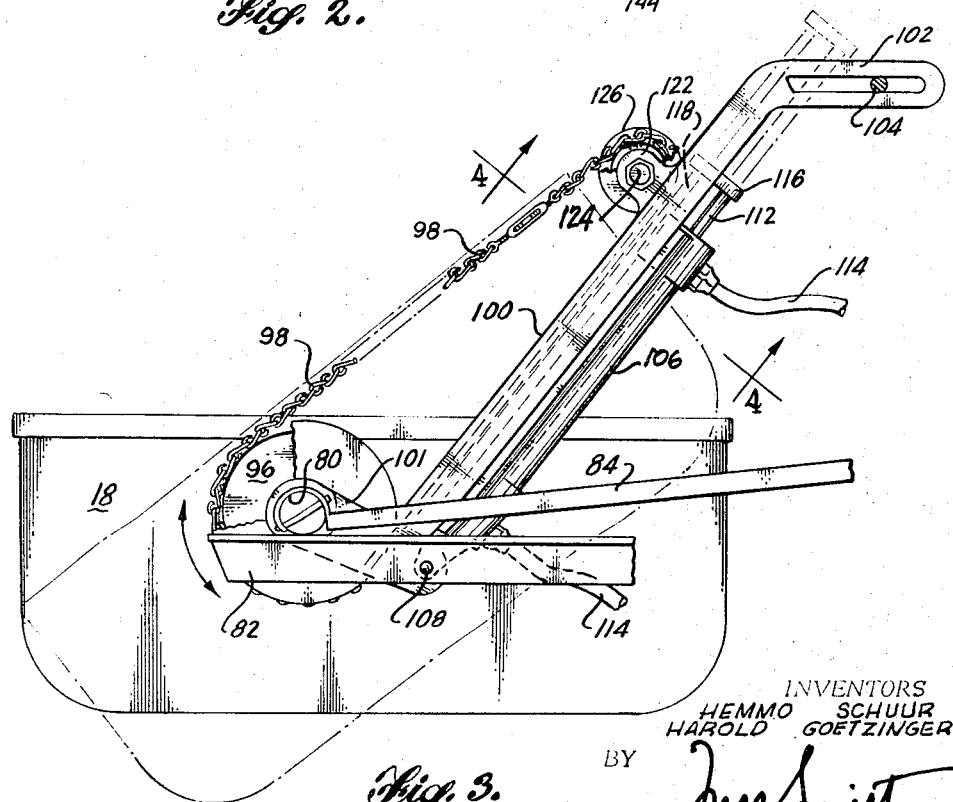
FIGURE 3 is a view in elevation taken in the plane indicated line 3—3 of FIGURE 2, portions having been omitted for convenience of illustration.
Figure 4:
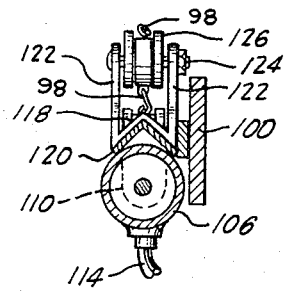
FIGURE 4 is a cross-sectional view of enlarged scale taken on line 4—4 of FIGURE 3.

Referring to FIGURE 3, it will be seen that trunnion 80 on the rear of the receptacle 18 is provided with a sheave or sprocket 96 around which passes chain 98. A movable support bar 100 has an arm 101 loosely journalled on the rear trunnion 80. Bar 100 is disposed generally at a rising angle relative the earth, and at its upper end has a slotted horn 102. A guide pin 104 carried on the front or wall or frame 14 passes through the slot of horn 102 permitting the same to be moved laterally but not otherwise. Turning to FIGURE 4, arm 100 will be seen to carry hydraulic expansible-contractible cylinder 106, the lower end of which is secured to an extension of arm 101 at 108. Cylinder 106 encloses a piston 110 and a piston rod 112 extends out of the cylinder at its upper end. Fluid under pressure is supplied to and exhausted from cylinder 106 by conduits 114. At its outer end, piston rod 112 has a cross head 116 that is connected to a slide member 118. Angle 120 constitutes guide means secured on the upper surface of cylinder 106. By means of a pair of upstanding ears 122, shaft 124 is supported and carries sheave 126 around which the chain 98 passes. Chain 98 is anchored to member 118 and is attached also to sheave 96 with a capscrew through one link only. As a fluid force is applied to the underside of the piston in cylinder 106 and piston is caused to move to extend rod 112 outward, member 118 likewise moves in a guided manner and carries with it the chain 98. This causes the same to revolve the sheave 96 and to tilt or rotate the container 18 as shown in FIGURE 3.

A pump and an oil reservoir feeding to the pump is contained in the longitudinal frame wall 10 to the right of the vehicle adding to the weight imposed on the wheels at that side of the vehicle. Lever 130 and controller box 71 actuates a switch means to activate electro-motive means for operating said pump and to thereby create the pressure to operate cylinder 106.

Again referring to FIGURES 1 and 2, it will be seen that there is on the upper surface of frame wall 110, an upstanding column 140 which is slidably mounted on guide rods 142, suitably supported at their ends by flanges 144. Cylinder 146, having piston rod 148 at its outer end, is mounted on frame member 10 and the rod 148 is connected to the column 140. In the manner previously described, fluid under pressure is applied to cylinder 146 by means of conduits 145. This supply means is under the control of switch lever 147 upstanding in the controller box 71. Extension or retraction of the piston rod 148 relative cylinder 146 moves the column 140 rearward or forward as desired.

A lateral support arm 150 is cantilevered from the upper end of column 140 to the left, over the top of the container 18. Its outer end supports upright standard 152 which is located generally forward and slightly to the left of a person standing on the operator's platform 72. By collar and clevis means 154, shown in FIGURE 1 as mounted on the lower end of the standard 152, a pivoted scraper arm 156 is secured in position. The rear end of bar 156 constitutes a handle for manipulating the same in its pivotal mount. On its forward end, bar 156 is pivotally connected to a scraper blade 158, here shown to be concave on its scraping side and elongated to extend across a dropping board on which it may be disposed. The dotted lines shown in FIGURE 1 indicate how the scraper may also be mounted in an upper position on the standard 152 as would be the case when the blade 158 is being used to scrape a superimposed or elevated second dropping deck.

It is customary in a typical poultry house for the droppings to be collected periodically as they are accumulated. Generally it is desirable that the collection be effected while the droppings are quite fluent and self-levelling. However, there are circumstances when this is not possible and a particular advantage of this cart becomes apparent. If, for example, the droppings being removed by scraper blade 158 tend to pile up and not flow laterally and self-level in the container 18, the operator may attain a leveling effect by slowly or gradually moving blade forward or retracting it and also by moving his container outward or inward to change the point at which it receives the falling droppings. This, of course, eliminates hand work in leveling the load.

The shifting or lateral movement of the container is also useful during dumping operations as, for example, where an operator would maneuver his vehicle into close proximity to the edge of a hopper or other transfer receiver. Depending on the weight of the load and his location relative the platform edge, over which he intends to dump, he can move the container 18 in or out by operation of the hand lever 90 in the manner above described and without impairing the action of the dumping mechanism.

In FIGURES 1 and 2 at the forward left corner of the machine is shown a vertical guide roller 160 on adjustable arm 162 which in turn is carried by arm 164 fastened to the half fork 24 of the left front wheel 22. Roller 160 can thereby be adjusted and located to bear upon a guiding edge 166 of a dropping board indicated by a dropping line in FIGURE 2.

It has been found that apparently due to the location of the dump bucket or receiver 18 being somewhat off-center outward from the main or median axis of the vehicle, there is a tendency of the steering front wheels 22 to veer slightly to the left. By adjusting the location of roller 160 appropriately, so that it rides on the guiding edge 166 provided by the dropping board or otherwise as by a rail, and setting his vehicle in forward motion, there is little or no necessity for the operator to steer the same along the course set by the dropping board or rail. This frees the operator to make appropriate adjustments of inclination of the scraper blade 158 in order to maximize the scraping action. He is also free to concern himself with an appropriate distribution of the load of droppings being received in the receptacle 18 in order to insure that it is properly filled and the load is suitably level.

From the foregoing it will be seen that this invention is essentially embodied in a vehicle which comprises two spaced apart pairs of wheels 22, 22 and 62, 62. Associated with each of the wheel pairs is a transverse frame member 12 and 14 respectively, disposed substantially parallel to the axis of the paired wheels. There is a longitudinal frame member 10 which is rigidly secured at each end to like ends of and in angular relation to said transverse frame members 12 and 14. Member 10 is substantially in line, preferably to the right side, with like wheels of the pairs 22, 22 and 62, 62 as can best be seen in FIGURES 2 and 5. By loading one side of the frame substantial weight can be placed upon those wheels generally in line with member 10.

The transverse and longitudinal frame members 10, 12 and 14 define a laterally open well or space which, with member 10 to the right, is to the left of the vehicle viewing it from the rear. One pair of wheels, desirably rear wheels 62, 62, are powered by prime mover means 68 carried by the vehicle frame and so located that the weight of said means is applied to a greater degree to the loaded side wheels than to the other side wheels of said pairs. An upwardly open receptacle 18 is located in the well. In the preferred form receptacle 18 has trunnions 80 or other equivalent means which define a pivot axis for the receptacle longitudinal of the vehicle. The pivot axis of the container is outside of the median axis of the vehicle, that is away from the loaded side of the vehicle. Where the receptacle 18 has trunnions the same are rotatably mounted or resting upon ledges 82 carried by the transverse frame members 12 and 14. They mount the receptacle 18 for rotary dumping movement about the axis established by the trunnions and for lateral shifting movement. Means is included for rotating receptacle 18 comprising in the case of trunnion pivots the sheave 96, chain 98, an actuation cylinder 106, and the draft link 118 actuated by piston rod 112 protruding from the end of cylinder 106.

The receptacle is transversely shifted by means comprising the push-pull links 84 associated at one end with the receptacle trunnions 80 and at their other ends with levers 86 and 90 adapted for manual manipulation.

A scraper blade 158, carried by arm 156 pivotly mounted on the column 152, is primarily supported by arm 150 extending laterally from the movable column 140. The latter is slideable forward and rearward along the upper surface of the longitudinal frame member.

An operator standing on the platform 72, riding the vehicle, steers the same in the conventional manner as described above. By manipulation of steering wheel 38 he may cant or turn the wheels 22, 22 to the right or left. Preferably he establishes a line of travel in which the roller 160 on arm 162 is in contact with a guide rail to his left. Ordinarily the receptacle 18 is disposed outward sufficiently that droppings or litter will cascade into it as they are removed from the dropping boards or shelves by the scraper 158. The scraper blade is normally set at a slight or flat angle to the direction of travel and so arranged that from its forward to rear edge it traverses the dropping board and scrapes its entire upper suface. It may be that the operator will prefer to start filling the receptacle 18 with it fully extended to insure that, as the load therein accumulates, it does so nearer the center of the vehicle. In that case as the load accumulates the operator will gradually move the receptacle inward into the well, thus avoiding the load piling too high or to such an extent that it may overflow the receptacle ends or inner side.

By reason of the tendency of the vehicle to veer to the left as it is loaded, the operator's left hand at least is freed from the steering wheel and may be employed to manipulate the arm 156 to adjust or improve the scraping action of blade 158. In case he is scraping an upper level dropping board the pivoted arm 156 is mounted in the upper clevis and swivel fastener 154 in which instance the action is substantially the same as described.

It will be apparent to those skilled in the art that modifications and alterations in the arrangement of components and parts in this vehicle may be effected without materially altering the operation of the invention. All such changes and modifications as may occur to those skilled in the art, having due regard for the appropriate application of the principles of equivalency, are intended to be embraced by this invention so long as they appropriately fall within the spirit and scope of the invention and the claims that follow.

Having thus described the invention, what is claimed is:

1. A vehicle, comprising:
two spaced apart pairs of wheels;
a transverse frame member associated with each pair of wheels substantially parallel to their axes;
a longitudinal frame member rigidly secured at each end to like ends of and in angular relation to said transverse frame members and substantially in line with like wheels of said pairs;
said transverse and longitudinal frame members defining a well laterally open away from said longitudinal member;
one pair of said wheels being powered by prime mover means carried by said vehicle frame in such manner that the weight thereof is applied to the wheels of said pairs in line with said longitudinal frame member to a greater degree than to said other wheels of said pairs;
an upwardly open receptacle in said well;
means defining a pivot axis longitudinal of said vehicle, said means being located between said receptacle and said transverse frame members and mounting said receptacle for rotary dumping movement about said axis;
means for rotating said receptacle;
means for transversely shifting said pivot axis defining means relative the longitudinal axis of said vehicle to move said receptacle laterally in said well; and
scraper blade means carried by said vehicle to operate upon a shelf overlying a portion of said receptacle.

2. A vehicle as set forth in claim 1 in which the other pair of said wheels is steerable and said vehicle includes means for steering said wheels.

3. A vehicle according to claim 1 in which the means defining a pivot axis longitudinal of such vehicle comprises trunnion on said receptacle and said transverse member each include a ledge on which a trunnion rests and may be transversely shifted.

4. A vehicle in accordance with claim 1 in which sprocket is associated with one of said trunnions and a sprocket chain passing around said sprocket is activated by power means to reversibly rotate said sprockets.

5. A structure according to claim 1 in which the scraper blade means is carried by a support member movably mounted on said longitudinal frame member for fore and aft movement and means is provided for forwardly and rearwardly moving said support members.

6. A vehicle in accordance with claim 1 in which the prime mover means is an electro-mechanical driver and there is included a weighty source of electrical energy the weight of which primarily rests upon the longitudinal frame member.

7. A structure according to claim 2 in which that steerable wheel that is in spaced relation to the steerable wheel in line with the longitudinal frame member is provided with a feeler apparatus outstanding to that side of the vehicle to contact a guiding surface and be guided thereby as the vehicle moving forwardly veers toward said guiding surface.

No references cited.

CHARLES A. WILLMUTH, *Primary Examiner.*

L. G. MACHLIN, *Assistant Examiner.*